United States Patent [19]

Redmond, Jr.

[11] Patent Number: 4,506,203
[45] Date of Patent: Mar. 19, 1985

[54] SMALL DEADBAND SERVOCONTROL SYSTEM
[75] Inventor: William G. Redmond, Jr., Dallas, Tex.
[73] Assignee: LTV Aerospace and Defense Company, Dallas, Tex.
[21] Appl. No.: 434,154
[22] Filed: Oct. 13, 1982
[51] Int. Cl.³ ............................................... G05B 5/01
[52] U.S. Cl. .................... 318/624; 318/678; 318/681
[58] Field of Search ......................... 318/624, 678, 681
[56] References Cited
U.S. PATENT DOCUMENTS
3,736,486 5/1973 Gould .................................. 318/624

Primary Examiner—Stanley J. Witkowski
Assistant Examiner—Saul M. Bergmann
Attorney, Agent, or Firm—James M. Cate; Stephen S. Sadacca

[57] ABSTRACT

A circuit for controlling the position of a driven member is disclosed which includes a control circuit for controlling the application of electrical power to a motor and a circuit element operable for generating position error signals corresponding to the position of the load which may in one embodiment constitute a rotor element of the motor. A comparator section is provided for comparing the position error signals with position reference signals and for generating control signals to effect rotation of the load in a desired direction. In one embodiment, the error signal is generated by a feedback loop including a potentiometer having a movable element coupled to the load or motor rotor, wherein the voltage magnitude of the error signal is varied in accordance with the rotational position of the load or rotor element. In a preferred embodiment, the comparator section includes first and second comparators respectively responsive to position deviations of the rotor in first and second rotational directions.

18 Claims, 3 Drawing Figures

SMALL DEADBAND SERVOCONTROL SYSTEM

TECHNICAL FIELD

The present invention relates to servocontrol systems and, more particularly, to a servocontrol system having a particularly narrow deadband, adaptable for precisely controlling the rotational position of a permanent magnet reversible motor utilized in a closed-loop control system such as that employed in a missile attitude correction device.

BACKGROUND ART

Servocontrol systems are well known for use in the actuation and control of reversible motors. Various damping methods are used in conventional control systems to minimize the number of oscillations made by a motor while braking. One method is disclosed in U.S. Pat. No. 3,378,740, issued Apr. 16, 1968 to R. Cruel in which a damping member is connected in parallel with the motor's armature. In one embodiment, the damping member is a resistor; however, continued reduction of the resistor's ohmic value in an effort to further increase the amount of damping achieved results in a limitation of the speed of the motor as the resistance of the damping member approaches the resistance of the motor's armature. In an alternative embodiment of the Cruel device, a transistor is substituted for the resistor to act as the damping member, in which the transistor's collector-to-emitter path is connected in parallel across the motor's armature. This configuration produces forceful braking of the motor, but only in one direction. No braking force is applied once the motor changes direction, resulting in unbalanced control of the motor.

Another servocontrol device is disclosed in U.S. Pat. No. 3,134,036, issued May 19, 1964 to B. Fisher, et al., in which two duo-triode vacuum tubes are used to compare a feedback signal, indicating a motor's position, to a preselected control signal and to alternately actuate one of two relays causing said motor to rotate in a particular direction. In this circuit, which requires multiple power supply or voltage source which must float independently of each other, proportional actuation of the relays is effected, a method less desirable than an instantaneous application or elimination of threshold voltage since the contact arms of said relays could become fixed in a position midway the contacts due to partial energizing of the relay coils. Furthermore, the deadband range is controlled in this configuration by adjustment of the gain of one duo-triode vacuum tube through the use of a potentiometer connected in parallel with the plates of said vacuum tube. This is an imprecise method of establishing deadband limits, since the resistance value to which the potentiometer is set in order to obtain a certain gain would vary according to the particular characteristics of any given vacuum tube.

Other proposed methods for providing precise positioning control of reversible motors include the use of complex integrated circuitry by which power is turned on and off and applied in alternating directions to control the position of the motor. Although such systems are effective, there is a need for an uncomplicated, efficient and inexpensive closed-loop servocontrol system.

It is, accordingly, an object of the present invention to provide an improved servocontrol system.

It is another object of the invention to provide a simple, but effective, servocontrol system operable in conjunction with a reversible DC motor to provide precise rotational position control of the motor in a closed-loop system having a minimum deadband, to reduce undesirable motor oscillation while braking.

It is also an object of the present invention to provide a servocontrol system which facilitates the adjustment of the magnitude of the deadband, employing a single resistor, thus permitting system flexibility under varying load requirements while maintaining a consistently high level of component sensitivity.

Another object of the invention is to provide a remote load positioning device having a single polarity primary power source and utilizing the counter electromotive force (emf) of the motor to provide dynamic braking, thereby requiring no additional energy provided by the primary power source for restraining the motor.

Yet another object of the invention is to provide a control circuit which is operational with either mechanical switching devices for economy and circuit simplicity, or with solid state switching devices for maximum component longevity and for use in size restricted applications.

Still another object of the invention is to provide a control circuit having dual relays, each operational to cause motor rotation in a particular direction, yet causing the motor to brake when both relays are in a normal, deactivated state, thereby eliminating any need for sequential operation of the relays and resulting in a simple, inexpensive control system.

BRIEF DESCRIPTION OF THE INVENTION

These and other objects are accomplished in accordance with the present invention in which a circuit section is provided to variably control a reversible motor. The circuit includes means for selectively applying power to the motor. When power is not being applied to the motor, braking is facilitated through the utilization of the motor's counter electromotive force. The motor's position is fed back to the control circuit and a position error voltage is generated which is compared to two preset or preselected voltages. The preset voltages define the upper and lower limits of a deadband voltage range. Only when the error voltage falls outside of the deadband range is power applied to the motor.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENTS

Figure 1:
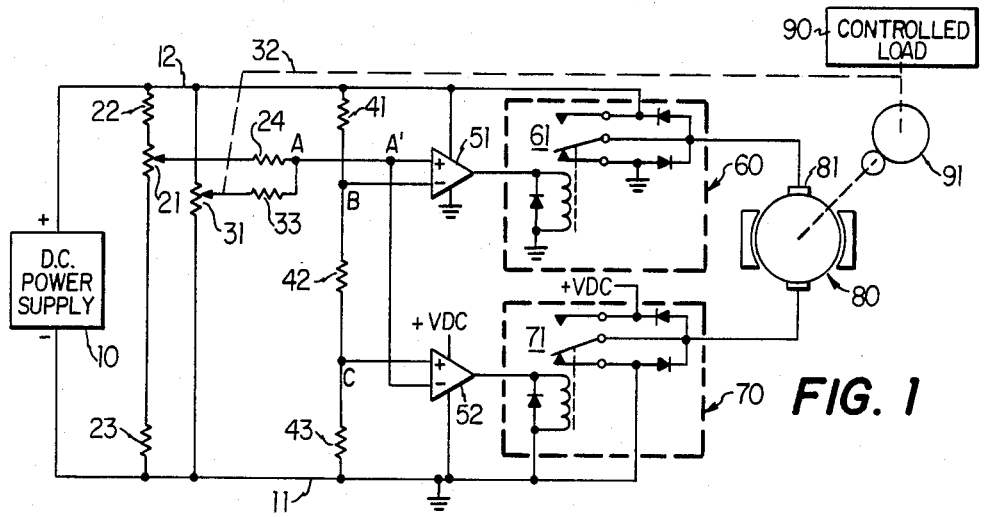
FIG. 1 is a schematic diagram showing one preferred embodiment of the present invention in which a servocontrol system utilizes a single source of power for operation of both the control circuitry and the motor, and relay switching devices are used to apply power to the motor.

Referring now to FIG. 1, a controlled element or load, designated diagrammatically as 90, is controlled by a servomotor 80 in response to signals generated as a result of position error between a command position signal and a position feedback signal. A DC power supply 10 (28 volts, for example) is coupled between a ground negative bus 11 and a positive DC supply bus 12. A command position signal is generated by an input signal control circuit, which in the present embodiment comprises a command potentiometer 21 connected in series between a first resistor 22 and a second resistor 23 which are in turn connected between positive and ground buses 12 and 11. Adjustment of the movable wiper element of potentiometer 21 generates a control or command signal of predetermined voltage level which is conducted through a resistor 24 to node A. A feedback potentiometer 31 is also connected in series between buses 12 and 11 and is coupled by a mechanical linkage, as indicated diagrammatically at line 32, to controlled element 90. Accordingly, when the controlled element 90 is displaced, the movable wiper element of feedback potentiometer 31 is correspondingly displaced, varying the feedback voltage which is conducted through a resistor 33 to node A, at which the feedback and control voltages combine in a manner in which the feedback voltage nullifies the control voltage. The resulting voltage at node A is an error voltage signal indicative of the position of the controlled element 90 relative to the command position signal. Resistors 24 and 33 are essentially the same value in this embodiment.

First and second operational amplifiers (or comparators) 51 and 52 are coupled to receive the supply bus voltage (from bus 12) through their respective power supply inputs, and their return terminals are coupled to ground (through bus 11). The inverting input terminal of operational amplifier 52 is coupled to node A', whereas the non-inverting input of operational amplifier 51 is coupled to node A', thereby applying the error voltage signal to both amplifiers 51 and 52. A voltage divider circuit comprising resistors 41, 42 and 43, is coupled between positive voltage and ground buses 12 and 11, respectively. In the present embodiment, resistors 41 and 43 have approximately equivalent resistances of, for example, 5.1 K ohms, and center resistor 42 has a relatively small resistance, e.g. 37 ohms, whereby the difference between the voltages at nodes B and C, located on either respective sides of the center resistor 42, is very small relative to the (e.g. 28 volt) supply voltage. The voltages at node B and at node C set the limits of the allowable deadband voltage range outside of which corrective action of the servomotor 80 is implemented. Using the previously stated resistance values for the voltage divider circuit and a nominal supply voltage of 28 volts, the voltage at node B is, for example, approximately 14.05 and the voltage at node C is for example approximately 13.95. Node B is a junction for the inverting terminal of operational amplifier 51, while node C is a junction for the noninverting terminal of operational amplifier 52. With respect to operational amplifier 51, if the voltage received from node A to the noninverting input rises above the node B reference voltage of 14.05 volts, because of a change in the physical position of controlled element 90 or wiper of command pot 21, the output terminal of operational amplifier 51 applies voltage to the coil of a first relay 60 thereby energizing relay 60 and closing contacts 61 so that voltage is applied through the upper contact, as viewed in the drawing, from the supply bus 12 to motor armature 81, driving the servomotor 80 in a first rotational direction, in order to correct the position of controlled element 90 through gears 91 (FIG. 1) or other suitable transmission apparatus.

As controlled element 90 moves in the corrective direction, the movable wiper element of feedback potentiometer 31 is correspondingly moved until the voltage at node A is reduced below the 14.05 volt level, at which point the output voltage from operational amplifier 51 is reduced, resulting in the deactivation of relay 60. During this quiescent condition, the arm of contact 61 returns to its normally off position forming a direct path to ground. Provided the voltage at node A remains within the deadband voltage range of 13.95 to 14.05 volts, a continuous circuit to ground is provided through armature 81 by relay contact 61 and relay contact 71, each located on opposite sides of the motor 80. Accordingly, further movement of the armature 81 is opposed by current flow through the grounded armature induced by the motor's counter electromotive force (emf). As is known in the art, a counter emf is generated within a motor during such momentum-induced rotational movement.

Should the voltage received from node A' to the inverting input of operational amplifier 52 fall below the null position range, the output of operational amplifier 52 rises in a manner similar to that previously described with respect to amplifier 51 resulting in the activation of relay 70, thereby applying power through contacts 71, that is, through the upper contact as viewed in the drawing, to the armature 81 of servomotor 80, and thus driving the motor in a second, opposite rotational direction due to the reversed current flow provided by the configuration of the components.

Figure 2:
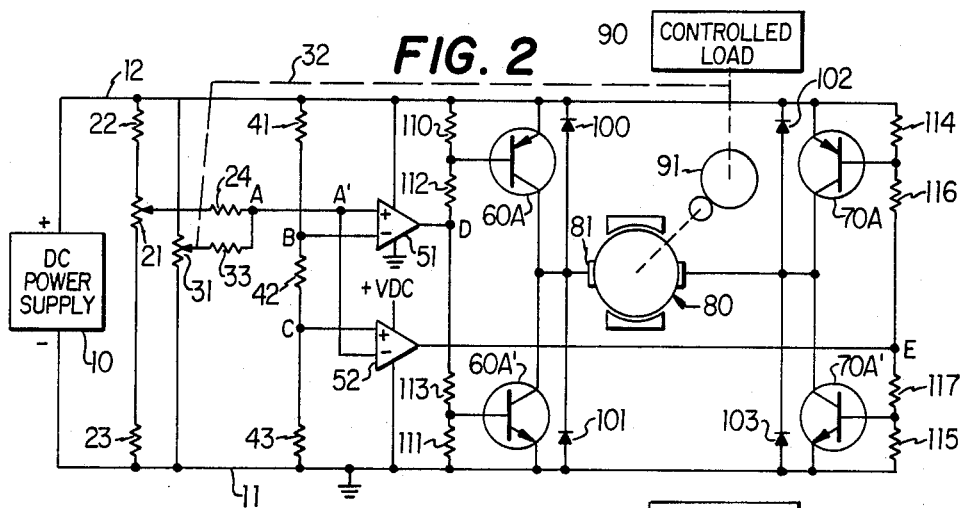
FIG. 2 is a schematic diagram of an alternate preferred embodiment of the present invention in which a servocontrol system utilizes a single source of power for operation of both the control circuitry and the motor, and a transistor bridge is used to apply power to the motor.

Referring to FIG. 2, a circuit similar to that of FIG. 1 is shown in which relays 60 and 70 of FIG. 1 have been replaced by solid state switching devices. A first transistor switching circuit, comprised of first p-n-p transistor 60A and second n-p-n transistor 60A' is connected in series between positive supply bus 12 and ground bus 11. The emitter of p-n-p transistor 60A is coupled to supply bus 12 and the emitter of transistor 60A' is coupled to ground bus 11. The collectors of both transistors 60A and 60A' are jointly connected to one side of armature 81 of servomotor 80. The other side of the armature is similarily connected between a third p-n-p transistor 70A and a fourth n-p-n transistor 70A' at their respective collector junctions. The emitter of transistor 70A is connected to supply bus 12 and the emitter of transistor 70A' is connected to ground bus 11.

Transistors 60A, 60A', 70A and 70A' comprise a transistor bridge circuit for conducting current in the proper direction to the motor 80 in response to output signals from operational amplifiers 51 and 52. When controlled element 90 is at a null position, as defined by the deadband voltage range, operational amplifiers 51 and 52 are in the quiescent state, wherein they are both turned off, and the outputs at nodes D and E, respectively, are near ground. Accordingly, transistors 60A' and 70A' are turned off while transistors 60A and 70A are turned on.

If the signal generated by command potentiometer 21 is changed, or if the load 90 is repositioned, then the output voltage of one of operational amplifiers 51 or 52 increases, actuating a portion of the transistor bridge. If, for example, operational amplifier 51 is actuated as a result of an increasing feedback voltage, then the voltage on its output rises toward the supply voltage level, turning off transistor 60A and turning on transistor 60A' (transistor 70A is at this point normally on and transistor 70A' is off). This provides a circuit path through transistors 70A and 60A' to drive the motor in a first rotational direction. Alternatively, if operational amplifier 52 is actuated by a deceasing feedback voltage, the output of operational amplifier 51 is in a low condition and transistors 60A and 70A' are turned on, driving motor 80 in the opposite direction.

Diodes 100, 101, 102, and 103 provide protection for transistors 60A, 60A', 70A, and 70A' respectively against inductive voltage spikes when the transistors are turned off. Each diode is of a polarity opposite that of the emitter of its respective transistor.

Resistors 110 through 118 are base-biasing resistors to effect switching of transistors 60A, 60A', 70A and 70A' at desired voltage levels.

Figure 3:
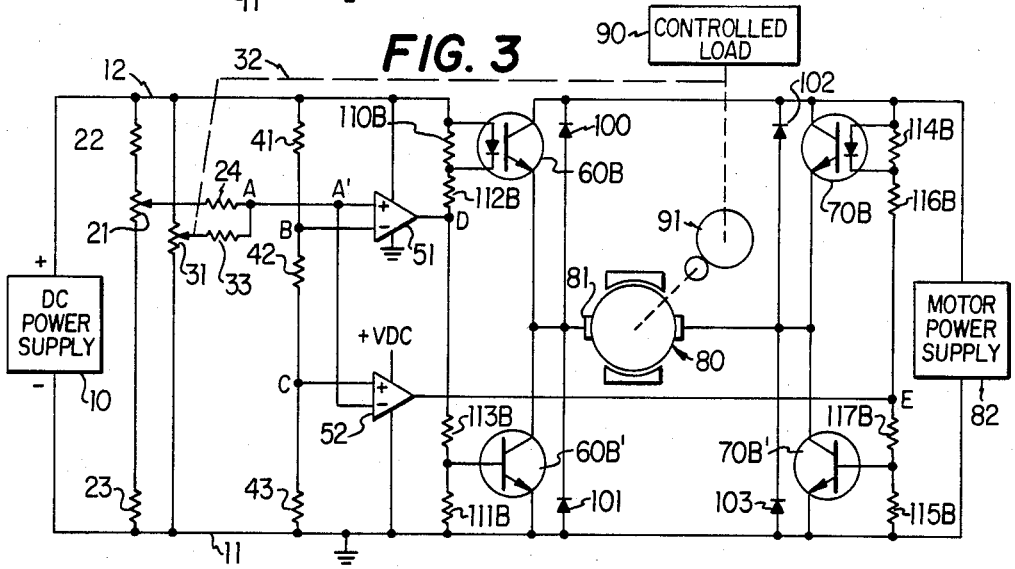
FIG. 3 is a schematic diagram of still another preferred embodiment of the present invention in which a servocontrol system utilizes optical isolating transistors to permit the use of a separate source of power for the motor than is used for the control circuitry.

Referring now to FIG. 3, still another embodiment of the invention is shown which utilizes optical coupling transistors 60B and 70B in place of FIG. 2 transistors 60A and 70A, thereby allowing the use of a separate power supply 82, which may be of a higher or lower voltage than control circuit power supply 10, to drive motor 80. Transistors 60B and 70B operate similarily to transistors 60A and 70A of the FIG. 2 embodiment, except that direct coupling of the collector terminals to power supply bus 12 is not required, the collectors being instead connected to motor power supply 82. This is advantageous for certain applications. With direct coupling of motor 80 to control circuit power supply 10 (FIG. 2), motor 80, upon energization, causes a voltage drop from power supply 10 which limits the capability of operational amplifiers 51 and 52. In the embodiment shown in FIG. 3, the motor power supply circuitry is isolated by optical coupling transistors 60B and 70B from the control circuitry, permitting a constant voltage to be maintained across the control circuit and permitting the use of a higher or lower voltage power supply 82 for the motor. Resistors 110B and 114B serve to permit the application of appropriate power levels to the light-emitting diodes of transistors 60B and 70B, respectively. When light-emitting diodes in transistors 60B and 70B are turned on due to a current flowing through the diodes, as output from operational amplifiers 51 and 52 goes low, transistors 60B and 70B are turned on. Thus, circuit performance in relation to the output from amplifiers 51 and 52 is essentially unchanged from that previously described for FIG. 2.

Several embodiments of the invention have now been described in detail. Still further embodiments are contemplated within the spirit and scope of the invention. Thus, the invention is not to be limited to the described details except as set forth in the appended claims.

What is claimed is:

1. A circuit for controlling the position of a reversible motor having a driven member, which comprises:
   (a) control means for selectively controlling the application and polarity of electrical power to said motor to cause movement of said driven member in either direction;
   (b) means responsive to the position of said driven member for generating a position feedback signal indicative of the actual position of said driven member;
   (c) means for generating a command position signal indicative of a desired position of said driven member;
   (d) means responsive to said command position signal and to said position feedback signal for generating a position error signal indicative of the relative difference between the actual position and the desired position of said driven member;
   (e) means for generating a plurality of reference voltages; and
   (f) a pair of comparator means coupled to said control means, each of said comparator means for comparing the voltage magnitude of said position error signal to a respective voltage magnitude of said reference signal and applying a control signal to said control means until the difference between the magnitude of the respective reference voltage and the error signal falls within a predetermined deadband voltage limit.

2. A circuit as recited in claim 1, wherein said motor is a reversible motor and said driven member is a rotor.

3. A circuit as recited in claim 2, wherein said comparator means comprises a first comparator means responsive to position deviations of said rotor in a first rotational direction, and a second comparator means responsive to position deviations of said rotor in the opposite direction.

4. A circuit as recited in claim 3, wherein said voltage divider circuit is coupled to both of said first and second comparator means and comprises means defining a deadband voltage range intermediate first and second voltages applied to said comparator means by said voltage divider circuit.

5. A circuit as recited in claim 2, having a single polarity primary power source.

6. A circuit for controlling the position of the rotor member of a reversible motor, which comprises:
   (a) control means comprised of first and second switchable means for selectively controlling the application and polarity of electrical power to said motor to cause rotational movement of said rotor member in a desired direction;
   (b) means responsive to the position of said rotor member for generating a position feedback signal indicative of the actual position of said rotor member;
   (c) means for generating a command position signal indicative of a desired position of said rotor member;
   (d) means responsive to said command position signal and to said position feedback signal for generating a position error signal indicative of the relative difference between the actual position and the desired position of said rotor member;
   (e) voltage divider means for generating a plurality of reference voltages; and
   (f) first and second comparator means coupled to said control means for comparing the voltage magnitude of said position error signal to the voltage magnitude of respective reference voltages and generating control signals to said switchable means to effect rotation of said rotor in a desired direction until the difference between the magnitudes of the respective reference voltage and the error signal falls within a predetermined dead-band voltage range.

7. A circuit as recited in claim 6, wherein said control means includes a plurality optical isolating transistor for applying electrical power to the motor from a second power source.

8. A circuit as recited in claim 6, wherein said error signal generation means comprises a feedback loop including a potentiometer having a moveable wiper element mechanically coupled to said rotor member, wherein the position of said rotor member varies the voltage magnitude of said position feedback signal.

9. A circuit as recited in claim 6 wherein said command position signal generation means comprises a second potentiometer means having a moveable wiper element wherein the voltage magnitude of said command position signal vaires in accordance with the position of the moveable wiper element of said second potentiometer means.

10. A circuit for controlling the position of a motor driven member, comprising:
a reversible motor drivingly connected to the driven member;
first means, for selectively applying electrical power to the motor;
second means, for generating an input signal corresponding to the difference between the desired position and the actual position of the driven member;
third means, for generating first and second reference potentials, the first reference potential being of a higher voltage than the second reference potential;
fourth means, for comparing the input signal with the first and second reference potentials and for applying a first signal to the first means upon the input signal being of higher potential than the first reference potential to drive the motor in one direction and for applying a second signal to the first means upon the input signal being of lower potential than the second reference potential to drive the motor in the opposite direction.

11. The apparatus of claim 10, the second means comprising means for generating a signal corresponding to the relative position of the driven member with respect to a desired position.

12. The apparatus of claim 11, the second means comprising means for generating a signal corresponding to the difference between the desired position and the position of the driven member.

13. The apparatus of claim 10, the fourth means comprising means for applying a command signal to the first means upon the input signal being of a lower potential than the second reference potential and for preventing the application of a command signal to the fourth means upon the input signal being of a potential greater than the second reference potential and less than the first reference potential, wherein the fourth means comprises first and second comparator means.

14. The apparatus of claim 10, the first means comprising means for applying power of a first polarity to drive the motor in a first rotational direction upon reception of a first signal from the fourth means when the input signal is of higher potential than the first reference potential.

15. The apparatus of claim 14, the first means comprising means for applying power of polarity opposite to said first polarity to drive the motor in a second rotational direction upon reception of a second signal from the fourth means when the input signal is of a lower potential than the second reference potential.

16. A circuit as recited in claim 1 wherein said means for generating a reference signal is comprised of a voltage divider circuit coupled to each said comparator means, wherein said dead-band voltage limit is defined by resistance values within said voltage divider circuit.

17. A circuit as recited in claim 1, wherein said error signal generation means comprises a feedback loop including a potentiometer having a moveable wiper element mechanically coupled to said driven member, wherein the position of said driven member varies the voltage magnitude of said position feedback signal.

18. A circuit as recited in claim 1 wherein said command position signal generation means comprises a second potentiometer means having a moveable wiper element wherein the voltage magnitude of said command position signal varies in accordance with the position of the moveable wiper element of said second potentiometer means.

* * * * *